US011589031B2

(12) United States Patent
Khamis et al.

(10) Patent No.: US 11,589,031 B2
(45) Date of Patent: Feb. 21, 2023

(54) ACTIVE STEREO DEPTH PREDICTION BASED ON COARSE MATCHING

(71) Applicant: Google LLC, Mountain View, CA (US)

(72) Inventors: Sameh Khamis, Mountain View, CA (US); Yinda Zhang, Mountain View, CA (US); Christoph Rhemann, Mountain View, CA (US); Julien Valentin, Mountain View, CA (US); Adarsh Kowdle, San Francisco, CA (US); Vladimir Tankovich, Renton, WA (US); Michael Schoenberg, Mountain View, CA (US); Shahram Izadi, Tiburon, CA (US); Thomas Funkhouser, Mountain View, CA (US); Sean Fanello, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 16/580,802

(22) Filed: Sep. 24, 2019

(65) Prior Publication Data

US 2020/0099920 A1 Mar. 26, 2020

Related U.S. Application Data

(60) Provisional application No. 62/736,628, filed on Sep. 26, 2018, provisional application No. 62/740,072, filed on Oct. 2, 2018.

(51) Int. Cl.
*H04N 13/271* (2018.01)
*G06T 7/90* (2017.01)
(Continued)

(52) U.S. Cl.
CPC .......... *H04N 13/271* (2018.05); *G06T 7/521* (2017.01); *G06T 7/90* (2017.01); *H04N 5/33* (2013.01);
(Continued)

(58) Field of Classification Search
CPC ...... H04N 13/271; H04N 13/239; H04N 5/33; G06T 7/521; G06T 7/90; G06T 2207/10024; G06T 2207/10028
(Continued)

(56) References Cited

U.S. PATENT DOCUMENTS 8,937,646 B1 * 1/2015 Baldwin ................ H04N 5/262
348/47
2010/0141651 A1 * 6/2010 Tan ......................... G06T 7/579
345/420

(Continued)

OTHER PUBLICATIONS

Kuznietsov, Y. et al., "Semi-Supervised Deep Learning for Monocular Depth Map Prediction" Proceedings of the IEEE Conference on Computer Vision and Pattern Recognition; Jul. 2017; 9 pages.
(Continued)

*Primary Examiner* — Christopher S Kelley
*Assistant Examiner* — Asmamaw G Tarko

(57) ABSTRACT

An electronic device estimates a depth map of an environment based on matching reduced-resolution stereo depth images captured by depth cameras to generate a coarse disparity (depth) map. The electronic device downsamples depth images captured by the depth cameras and matches sections of the reduced-resolution images to each other to generate a coarse depth map. The electronic device upsamples the coarse depth map to a higher resolution and refines the upsampled depth map to generate a high-resolution depth map to support location-based functionality.

11 Claims, 6 Drawing Sheets

(51) Int. Cl.
 G06T 7/521 (2017.01)
 H04N 5/33 (2006.01)
 H04N 13/239 (2018.01)
(52) U.S. Cl.
 CPC . H04N 13/239 (2018.05); G06T 2207/10024 (2013.01); G06T 2207/10028 (2013.01)
(58) Field of Classification Search
 USPC .......................................................... 348/47
 See application file for complete search history.

(56) References Cited

U.S. PATENT DOCUMENTS

| | | | |
|---|---|---|---|
| 2012/0219236 A1* | 8/2012 | Ali | G06T 5/002 382/276 |
| 2013/0077852 A1* | 3/2013 | Chang | G06T 7/593 382/154 |
| 2014/0210951 A1* | 7/2014 | Cho | G06T 7/593 348/49 |
| 2014/0219547 A1* | 8/2014 | Tuzel | G06T 3/4053 382/154 |
| 2015/0256813 A1* | 9/2015 | Dal Mutto | G06T 7/593 348/47 |
| 2015/0339824 A1* | 11/2015 | Uliyar | H04N 13/271 348/46 |
| 2016/0012567 A1* | 1/2016 | Siddiqui | G06T 3/4007 382/154 |
| 2016/0241834 A1* | 8/2016 | Muninder | H04N 13/144 |
| 2016/0247286 A1* | 8/2016 | Mazurenko | G06K 9/00335 |
| 2016/0261844 A1* | 9/2016 | Kadambi | G01B 11/24 |
| 2017/0127039 A1* | 5/2017 | Liu | H04N 13/271 |
| 2017/0180706 A1* | 6/2017 | Salvagnini | G06T 7/85 |
| 2017/0186166 A1* | 6/2017 | Grunnet-Jepsen | H04N 13/239 |
| 2017/0195654 A1* | 7/2017 | Powers | G01J 1/4204 |
| 2017/0316602 A1* | 11/2017 | Smirnov | G06T 15/205 |
| 2017/0374352 A1* | 12/2017 | Horesh | H04N 5/2226 |
| 2018/0106905 A1* | 4/2018 | Hilliges | G06T 15/00 |
| 2018/0225866 A1* | 8/2018 | Zhang | G06T 7/593 |
| 2018/0352213 A1* | 12/2018 | Valentin | H04N 13/271 |
| 2019/0058859 A1* | 2/2019 | Price | H04N 13/111 |
| 2019/0304164 A1* | 10/2019 | Zhang | G06T 15/08 |
| 2019/0306489 A1* | 10/2019 | Cheng | H04N 13/239 |
| 2019/0318486 A1* | 10/2019 | Gupta | H04N 13/243 |
| 2020/0077116 A1* | 3/2020 | Lee | H04N 19/56 |
| 2020/0226773 A1* | 7/2020 | Gan | G06N 3/08 |
| 2020/0327685 A1* | 10/2020 | Ren | G06N 3/0454 |
| 2021/0082085 A1* | 3/2021 | Stimm | G06T 7/13 |
| 2021/0166411 A1* | 6/2021 | Akdemir | G06T 7/593 |

OTHER PUBLICATIONS

Liang, Z. et al., "Learning Deep Correspondence through Prior and Posterior Feature Constancy", Mar. 2018; arXiv; accessed on Sep. 25, 2019 at <<https://arxiv.org/pdf/1712.01039.pdf>>, 10 pages.
Lillicrap, T.P. et al., "Continuous control with deep reinforcement learning" arXiv preprint arXiv:1509.02971; Sep. 2015; 14 pages.
Luo, W. et al., "Efficient Deep Learning for Stereo Matching", Proceedings of the IEEE Conference on Computer Vision and Pattern Recognition; Jun. 2016; pp. 5695-5703.
Maas, A.L. et al., "Rectifier nonlinearities improve neural network acoustic models" Proc. icml. vol. 30, No. 1; Jun. 2013, 6 pages.
Mayer, N. et al., "A Large Dataset to Train Convolutional Networks for Disparity, Optical Flow, and Scene Flow Estimation", IEEE International Conference on Computer Vision and Pattern Recognition (CVPR); Jun. 2016; arXiv:1512.02134; 9 pages.
Menze, M. et al., "Object scene flow for autonomous vehicles" Conference on Computer Vision and Pattern Recognition (CVPR); Jun. 2015; 10 pages.
Naik et al., "A Light Transport Model for Mitigating Multipath Interference in Time-of-flight Sensors", IEEE Conference an Computer Vision and Pattern Recognition (CVPR), Jun. 2015, 9 pages.
Nehab, D. et al., "Improved sub-pixel stereo correspondences through symmetric refinement", International Conference on Computer Vision (ICCV); Oct. 2005; 7 pages.
Neil, T. et al., "Multi-Resolution Methods and Graduated Non-Convexity", Vision Through Optimization; 1997; accessed on Sep. 25, 2019 at <<http://homepages.inf.ed.ac.uk/rbf/CVonline/LOCAL_COPIES/BMVA96Tut/node29.html#SECTION00037400000000000000>>, 2 pages.
Nishihara, "PRISM: A Practical Mealtime Imaging Stereo Matcher", SPIE 0449, Intelligent Robots: 3rd International Conference on Robot Vision and Sensory Controls, Feb. 16, 1984, 36 pages.
Odena, A. et al., "Deconvolution and Checkerboard Artifacts", Distill (2016). Accessed on Sep. 25, 2019 at <<https://distill.pub/2016/deconv-checkerboard/?utm_source=mybridge&utm_medium=blog&utm_campaign=read_more>>, 9 pages.
Pang, J. et al., "Cascade Residual Learning: A Two-stage Convolutional Neural Network for Stereo Matching", IEEE International Conference on Computer Vision Workshops; Oct. 2017; 9 pages.
Papandreou, G. et al., "Modeling Local and Global Deformations in Deep Learning: Epitomic Convolution, Multiple Instance Learning, and Sliding Window Detection", IEEE Conference on Computer Vision and Pattern Recognition 2015; Jun. 2015; pp. 390-399.
Park, E. et al., "Transformation-grounded image generation network for novel 3d view synthesis", Proceedings of the IEEE Conference on Computer Vision and Pattern Recognition 2017, pp. 3500-3509.
Pinggera, P. et al., "Know Your Limits: Accuracy of Long Range Stereoscopic Object Measurements in Practice", European Conference on Computer Vision; Sep. 2014; pp. 96-111.
Pradeep et al., "MonoFusion: Real-time 3D Reconstruction of Small Scenes with a Single Web Camera", IEEE International Symposium on Mixed and Augmented Reality (ISMAR), Oct. 2013, 6 pages.
Ranftl, R. et al., "Pushing the Limits of Stereo Using Variational Stereo Estimation", 2012 IEEE Intelligent Vehicles Symposium 2012; Jun. 2012; 7 pages.
Sanger, T.D., "Stereo Disparity Computation Using Gabor Filters", Biological Cybernetics 59, 1988; pp. 405-418.
Scharstein et al., "A Taxonomy and Evaluation of Dense Two-Frame Stereo Correspondence Algorithms", Proceedings IEEE Workshop on Stereo and Multi-Baseline Vision (SMBV), Dec. 2001, 35 pages.
Scharstein et al., "High-Resolution Stereo Datasets with Subpixel-Accurate Ground Truth", German Conference on PatternRecognition, Sep. 2014; pp. 31-42.
Schulman, J. et al., "Gradient Estimation Using Stochastic Computation Graphs", Advances in Neural Information Processing Systems; 2015; pp. 3528-3536.
Seki, A. et al., "SGM-Nets: Semi-global Matching with Neural Networks", Proceedings of the IEEE Conference on Computer Vision and Pattern Recognition; 2017; pp. 231-240.
Shaked, A. et al., "Improved Stereo Matching with Constant Highway Networks and Reflective Confidence Learning", Proceedings of the IEEE Conference on Computer Vision and Pattern Recognition; 2017; pp. 4641-4650.
Szeliski, R. "Computer Vision: Algorithms and Applications" 1st edn. Springer-Verlag New York, Inc., New York, NY, USA; 2010; 979 pages.
Tankovich, V. et al., "SOS: Stereo Matching in O(1) with Slanted Support Windows", 2018 IEEE/RSJ International Conference on Intelligent Robots and Systems (IROS), 2018; pp. 6782-6789.
Taylor et al., "Articulated Distance Fields for Ultra-Fast Tracking of Hands Interacting", ACM Transactions on Graphics, vol. 36, Issue 6; Nov. 2017; 12 pages.
Taylor et al., "Efficient and Precise Interactive Hand Tracking Through Joint, Continuous Optimization of Pose and Correspondences", ACM Transactions on Graphics (TOG), vol. 35, Issue 4, Jul. 2016, 2 pages.
Wang et al., "The Global Patch Collider", IEEE Conference on Computer Vision and Pattern Recognition (CVPR), Jun. 2016, 9 pages.
Williams, R.J., "Simple Statistical Gradient-Following Algorithms for Connectionist Reinforcement Learning", Machine Learning 8, No. 3-4; May 1992; pp. 229-256.

(56) References Cited

OTHER PUBLICATIONS

Xie, J. et al., "Deep3D: Fully Automatic 2D-to-3D Video Conversion with Deep Convolutional Neural Networks", European Conference on Computer Vision, Oct. 2016; pp. 842-857.
Xu, K. et al., "Show, Attend and Tell: Neural Image Caption Generation with Visual Attention", International Conference on Machine Learning; Jun. 2015; pp. 2048-2057.
Yang, Q. et al., "Spatial-Depth Super Resolution for Range Images", 2007 IEEE Conference on Computer Vision and Pattern Recognition; Jun. 2007; pp. 1-8.
Yoon et al., "Adaptive support-weight approach for correspondence search", IEEE Transactions on Pattern Analysis and Machine Intelligence, vol. 28, Issue 4; Apr. 2006; pp. 650-656.
Yoon et al., "Locally Adaptive Support-Weight Approach for Visual Correspondence Search", IEEE Conference on Computer Vision and Pattern Recognition (CVPR), Jun. 2005, 8 pages.
Zagoruyko et al., "Learning to Compare Image Patches via Convolutional Neural Networks", IEEE Conference on Computer Vision and Pattern Recognition (CVPR), Jun. 2015, 9 pages.
Zbontar et al., "Computing the Stereo Matching Cost with a Convolutional Neural Network", IEEE Conference on Computer Vision and Pattern Recognition (CVPR), Jun. 2015, 8 pages.
Zbontar et al., "Stereo Matching by Training a Convolutional Neural Network to Compare Image Patches", Journal of Machine Learning Research 17; Jan. 2016; 32 pages.
Zhao, H. et al., "Loss Functions for Image Restoration With Neural Networks", IEEE Transactions on Computational Imaging, vol. 3, issue 1; Mar. 2017; pp. 47-57.
Zhong, Y. et al., "Self-Supervised Learning for Stereo Matching with Self-Improving Ability", arXiv preprint arXiv:1709.00930; 2017; 13 pages.
Zhou, T. et al., "Unsupervised learning of depth and ego-motion from video", Proceedings of the IEEE Conference on Computer Vision and Pattern Recognition, 2017; pp. 1851-1858.
Orts-Escolano et al., "Holoportation: Virtual 3D Teleportation in Real-time", ACM User Interface Software and Technology Symposium (UIST), Oct. 2016, 14 pages.
Abadi, M. et al., "Tensorflow: Large-Scale Machine Learning on heterogeneous distributed systems", arXiv preprint arXiv:1603.04467; Mar. 16, 2016, 19 pages.
Barron, J. T. "A General and Adaptive Robust Loss Function", arXiv:1701.030772019; Apr. 2019, 19 pages.
Besse, F. et al., "PMBP: PatchMatch Belief Propagation for Correspondence Field Estimation", International Journal of Computer Vision 110, No. 1, Oct. 2014; pp. 2-13.
Bhandari et al., "Resolving Multi-path Interference in Time-of-Flight Imaging via Modulation Frequency Diversity and Sparse Regularization", Optics Letters, vol. 39, Issue 6, Apr. 2014, 11 pages.
Bhandari, A. et al., "Resolving multipath interference in kinect: An inverse problem approach" IEEE Sensors, Nov. 2014; pp. 614-617.
Bleyer et al., "Simple but Effective Tree Structures for Dynamic Programming-Based Stereo Matching", International Conference on Computer Vision Theory and Applications (VISAPP), Jan. 2008, 8 pages.
Bleyer et al., "PatchMatch Stereo—Stereo Matching with Slanted Support Windows", British Machine Vision Conference (BMVC), Sep. 2011, 1 page.
Brachmann, E. et al., "Dsac-differentiable ransac for camera localization", IEEE Conference on Computer Vision and Pattern Recognition (CVPR) vol. 3; Jul. 2017; pp. 6684-6692.
Chapelle, O. et al., "Gradient descent optimization of smoothed information retrieval metrics", Information retrieval 13(3), Aug. 11, 2009; 21 pages.
Chen, Q. et al., "Fast Image Processing with Fully-Convolutional Networks", IEEE International Conference on Computer Vision, vol. 9; Oct. 2017; 10 pages.
Chen, Q. et al., "Photographic Image Synthesis with Cascaded Refinement Networks", IEEE International Conference on Computer Vision (ICCV). vol. 1; Oct. 2017; 10 pages.

Chen, Z. et al., "A Deep Visual Correspondence Embedding Model for Stereo Matching Costs", Proceedings of the IEEE International Conference on Computer Vision; Dec. 2015; pp. 972-980.
Delon, J. et al., "Small Baseline Stereovision" Journal of Mathematical Imaging and Vision, Springer Verlag, 2007; 28(3); 24 pages.
Dou et al., "Fusion4D: Real-time Performance Capture of Challenging Scenes", ACM Conference and Exhibition on Computer Graphics and Interactive Techniques (SIGGRAPH), Jul. 2016, 13 pages.
Dou, M. et al., "Motion2fusion: real-time volumetric performance capture," ACM Transactions on Graphics (TOG); vol. 36, No. 6; Nov. 20, 2017; pp. 1-16.
Fanello et al., "HyperDepth: Learning Depth from Structured Light Without Matching", IEEE Conference on Computer Vision and Pattern Recognition (CVPR), Jun. 2016, 10 pages.
Fanello et al., "Keep It Simple And Sparse: Real-Time Action Recognition", Journal of Machine Learning Research, vol. 14, 2013, 24 pages.
Fanello et al., "Learning to be a Depth Camera for Close-Range Human Capture and Interaction", ACM Transactions on Graphics (TOG), vol. 33, Issue 4, Jul. 2014, 11 pages.
Fanello et al., "Low Compute and Fully Parallel Computer Vision with HashMatch", IEEE International Conference on Computer Vision, Oct. 2017; 10 pages.
Fanello et al., "One-Shot Learning for Real-Time Action Recognition", Iberian Conference on Pattern Recognition and Image Analysis (IbPRIA), Jun. 2013, 10 pages.
Fanello et al., "Ultrastereo: Efficient learning-based matching for active stereo systems" In: Computer Vision and Pattern Recognition (CVPR), 2017 IEEE Conference on; pp. 6535-6544.
Felzenszwalb et al., "Efficient Belief Propagation for Early Vision", International Journal of Computer Vision, vol. 70, Issue 1, Oct. 2006, 8 pages.
Flynn, J. et al., "Deep Stereo: Learning to Predict New Views from the World's Imagery", Proceedings of the IEEE Conference on Computer Vision and Pattern Recognition; Jun. 2016; pp. 5515-5524.
Foi et al., "Practical Poissonian-Gaussian Noise Modeling and Fitting for Single-Image Raw-Data", IEEE Transactions on Image Processing, Oct. 2017, 18 pages.
Garg, R. et al., "Unsupervised CNN for Single View Depth Estimation: Geometry to the Rescue" European Conference on Computer Vision, Jul. 2016; pp. 740-756.
Geiger, A. et al., "Are we ready for Autonomous Driving? The KITTI Vision Benchmark Suite", IEEE Conference on Computer Vision and Pattern Recognition (CVPR); Jun. 2012; 8 pages.
Gharbi, M. et al., "Deep Bilateral Learning for Real-Time Image Enhancement", ACM Transactions on Graphics (TOG); 36(4); Aug. 2017; 12 pages.
Gidaris, S. et al., "Detect, Replace, Refine: Deep Structured Prediction for Pixel Wise Labeling", Proceedings of the IEEE Conference on Computer Vision and Pattern Recognition; Jul. 2017; pp. 5248-5257.
Godard, C. et al., "Unsupervised Monocular Depth Estimation with Left-Right Consistency", Proceedings of the IEEE Conference on Computer Vision and Pattern Recognition; Jul. 2017; 10 pages.
Hamzah, R.A. et al., "Literature survey on stereo vision disparity map algorithms", Journal of Sensors 2016; Article ID 8742920; 24 pages.
Hazan, E. et al., "On Graduated Optimization for Stochastic Non-Convex Problems", International Conference on Machine Learning, 2016; pp. 1833-1841.
He, K. et al., "Deep Residual Learning for Image Recognition", Proceedings of the IEEE Conference on Computer Vision and Pattern Recognition; Jun. 2016; pp. 770-778.
Hinton, G. et al., "Neural Networks for Machine Learning: Lecture 6a—Overview of Mini-batch Gradient Descent", 2012; accessed on Sep. 25, 2019: <<http://www.cs.toronto.edu/~hinton/coursera/lecture6/lec6.pdf>>; 31 pages.
Hirschmuller, "Stereo Processing by Semiglobal Matching and Mutual Information", IEEE Transactions on Pattern Analysis and Machine Intelligence, vol. 30, Issue 2, Feb. 2008, 14 pages.

(56) References Cited

OTHER PUBLICATIONS

Hosni et al., "Fast Cost-Volume Filtering for Visual Correspondence and Beyond", IEEE Transactions on Pattern Analysis and Machine Intelligence, vol. 35, Issue 2, Feb. 2013, 8 pages.

Ilg, E. et al., "Flownet 2.0: Evolution of Optical Flow Estimation with Deep Networks", IEEE Conference on Computer Vision and Pattern Recognition (CVPR); vol. 2; Jul. 2017; 9 pages.

Intel—Intel RealSense Depth Camera D435; accessed on Sep. 25, 2019 at <<https://click.intel.com/intelr-realsensetm-depth-camera-d435.html>>, 4 pages.

Intel—Intel RealSense Depth Camera D415; accessed on Sep. 25, 2019 at <<https://click.intel.com/intelr-realsensetm-depth-camera-d415.html>> 4 pages.

Ioffe, S. et al., "Batch Normalization: Accelerating Deep Network Training by Reducing Internal Covariate Shift," Proceedings of The 32nd International Conference on Machine Learning; Mar. 2015, pp. 448-456.

Izadi et al., "KinectFusion: Real-time 3D Reconstruction and Interaction Using a Moving Depth Camera", ACM Symposium on User Interface Software and Technology (UIST), Oct. 2011, 10 pages.

Jaderberg, M. et al., "Spatial Transformer Networks" Advances in Neural Information Processing Systems, 2015; pp. 2017-2025.

Johnson, J. et al., "Perceptual losses for real-time style transfer and super-resolution", European Conference on Computer Vision, Mar. 2016; pp. 694-711.

Kendall, A. et al., "End-to-End Learning of Geometry and Context for Deep Stereo Regression", Proceedings of the IEEE International Conference on Computer Vision 2017, pp. 66-75; arXiv:1703 04309.

Keselman et al., "Intel RealSenseTM Stereoscopic Depth Cameras", IEEE International Conference on Computer Vision and Pattern Recognition (CVPR), CVPR Workshop, Jul. 2017, 10 pages.

Klaus, A. et al., "Segment-Based Stereo Matching Using Belief Propagation and a Self-Adapting Dissimilarity Measure", 18th International Conference on Pattern Recognition; vol. 3; Aug. 2006; pp. 15-18.

Kolmogorov, V. et al., "Computing Visual Correspondence with Occlusions Using Graph Cuts" 8th IEEE International Conference on Computer Vision; vol. 2, Jul. 2011; pp. 508-515.

Konolige, "Projected Texture Stereo", IEEE International Conference on Robotics and Automation, May 2010, 8 pages.

Kopf, J. et al., "Joint Bilateral Upsampling", ACM Transactions on Graphics (ToG) 26(3), 96; 2007; 5 pages.

Kowalczuk, J. et al., "Real-Time Stereo Matching on CUDA Using an Iterative Refinement Method for Adaptive Support-Weight Correspondences", IEEE Transactions on Circuits and Systems for Video Technology; vol. 3, Issue 1; Jan. 2013; pp. 94-104.

Krahenbuhl, "Efficient Inference in Fully Connected CRFs with Gaussian Edge Potentials", http://arXiv.org, arXiv:1210.56441, cs.CV, Oct. 2012, 9 pages.

\* cited by examiner

ACTIVE STEREO DEPTH PREDICTION BASED ON COARSE MATCHING

CROSS-REFERENCE TO RELATED APPLICATIONS

This application claims priority to U.S. Provisional Patent Application No. 62/740,072, entitled "StereoNet: Guided Hierarchical Refinement for Real-Time Edge-Aware Depth Prediction" and filed on Oct. 2, 2018, and to U.S. Provisional Patent Application No. 62/736,628, entitled "ActiveStereoNet: End-to-End Self-Supervised Learning for Active Stereo Systems" and filed on Sep. 26, 2018, the entireties of which is incorporated by reference herein.

BACKGROUND

Depth cameras are used as inputs for computer vision tasks such as hand, body, or object tracking, three-dimensional (3D) reconstruction, and simultaneous localization and mapping (SLAM). Computation of a depth map relies on stereo triangulation between two images of a scene, which typically suffers in the presence of textureless regions, occlusions, repetitive patterns, thin structures, and reflective surfaces. In addition, computing a depth map typically requires vast amounts of processing power and memory, which often exceeds a computational budge of an electronic device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
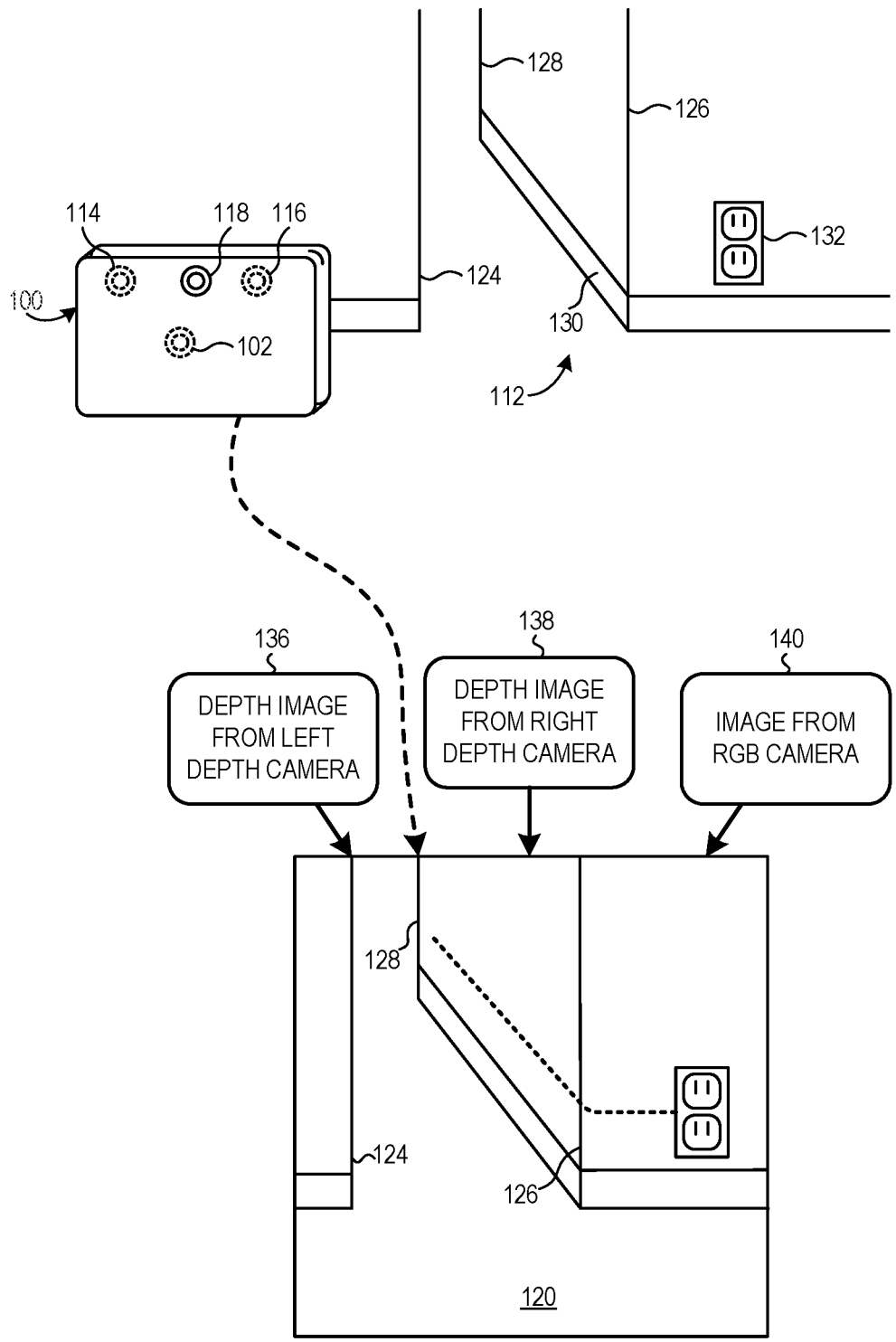
FIG. 1 is a diagram illustrating an electronic device using an active stereo depth camera to estimate a depth map of an environment based on coarse matching in accordance with some embodiments.

The following description is intended to convey a thorough understanding of the present disclosure by providing a number of specific embodiments and details involving estimation of a depth map of an environment based on matching downsampled stereo depth images. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-6 illustrate techniques for estimating a depth map of an environment by an electronic device based on matching downsampled (reduced resolution) stereo depth images captured by depth cameras to generate a coarse disparity (depth) map, upsampling the coarse disparity map to a higher resolution, and refining the upsampled disparity map to generate a high resolution depth map so as to support location-based functionality, such as augmented reality (AR) functionality, virtual reality (VR) functionality, visual localization/odometry or other simultaneous localization and mapping (SLAM) functionality, and the like. In some embodiments, an illuminator such as an infrared (IR) projector projects an illumination pattern into the environment to add texture to a scene. An infrared stereo camera pair including a first camera and a second camera augmented to perceive infrared spectra captures depth images of the environment while the illumination pattern is being projected.

A processor of the electronic device downsamples the images captured by the first and second cameras and matches sections (referred to as patches) of the reduced-resolution images from the first and second cameras to each other to generate a low-resolution disparity (also referred to as a coarse depth map). The processor then upsamples the coarse depth map to generate a full-resolution depth map. To refine the results, the processor determines an error of the full resolution depth map based on matching patches of the full resolution depth map to patches of one of the images captured by the first or second camera based on color.

In some embodiments, prior to matching patches of the reduced-resolution images, the processor normalizes pixel intensities of the reduced-resolution images by removing low frequency components and recalibrating a strength of the illumination pattern to account for fading of the illumination pattern with distance. Normalizing the pixels ameliorates the negative impact of oversaturated pixel intensities on matching, an effect that is exacerbated in an active stereo setting in which an illumination pattern floods the scene, saturating many pixels.

In some embodiments, the processor applies a window-based loss aggregation with adaptive weights for each pixel to increase the discriminability of the pixels and reduce the effect of local minima in a stereo cost function. A single pixel cost has many local minima, each of which may lie far from the actual optimum. By considering a window around each pixel and summing all the costs, the loss becomes smoother for both textured and textureless patches so that the actual optimum is more easily identified. In some embodiments, the processor applies the window-based loss aggregation in a training procedure so that the runtime cost is unaffected.

To handle occluded regions, in some embodiments, the processor computes a disparity from the left viewpoint to use as a hard constraint by defining a mask that ignores pixels with low disparities in the loss computation. The mask avoids oversmooth edges that become flying pixels in the pointcloud due to occluded pixels which do not have any useful information. The processor applies the mask both in the low-resolution disparity and in the final refined disparity.

FIG. 1 illustrates an electronic device 100 configured to support location-based functionality, such as SLAM, VR, or AR, using depth image data in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaming system remote, a television remote, and the like. In other embodiments, the electronic device 100 can include another type of mobile device, such as a head-mounted display, single camera, multi-sensor camera, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a plurality of sensors to obtain information regarding a local environment 112 of the electronic device 100. The electronic device 100 obtains visual information (imagery) for the local environment 112 via depth (infrared) cameras 114 and 116. In some embodiments, the electronic device 100 includes one or more color (RGB) imaging cameras 102. The depth cameras 114 and 116 (also referred to as left depth camera 114 and right depth camera 116), in one embodiment, use a modulated light illuminator 118 to project a modulated light pattern into the local environment 112, and capture reflections of the modulated light pattern as it reflects back from objects in the local environment 112. In some embodiments, the illuminator 118 emits infrared (IR) light. In some embodiments, the depth cameras 114 and 116 are implemented as a pair of monochrome infrared (IR) cameras with a bandpass filter. Although depth cameras 114 and 116 are referred to as left and right cameras in the example embodiment of FIG. 1, it will be appreciated that in other embodiments the cameras may be in different configurations and arrangements. It will further be appreciated that both cameras can capture images of the same environment concurrently.

In some embodiments, the illuminator 118 includes a vertical cavity surface emitting laser (VCSEL). A VCSEL emits light from a larger surface than a laser, and therefore emits more light while still being safe for eyes. In some embodiments, the illuminator 118 is coupled with one or more suitable masks (not shown) to emit structured light (i.e., modulated light patterns). In some embodiments, these modulated light patterns are temporally-modulated light patterns. The captured reflections of the modulated light patterns are referred to herein as "depth images." A processor (not shown) of the electronic device 100 then calculates the depths of the objects, that is, the distances of the objects from the electronic device 100, based on the analysis of the depth imagery.

The electronic device 100 generates depth data based on the detection of spatial features in image data captured by the depth cameras 114 and 116. To illustrate, in the depicted example of FIG. 1 the local environment 112 includes a hallway of an office building that includes three corners 124, 126, and 128, a baseboard 130, and an electrical outlet 132. In this example, the depth cameras 114, 116 capture depth images 136, 138 based on reflections of the first modulated light pattern projected by the illuminator 118 as it reflects back from objects in the local environment 112. In some embodiments, the electronic device trains or calibrates the processor (not shown) based on images 140 of the local environment 112 captured by the RGB camera 102.

The processor (not shown) of the electronic device 100 estimates the depths of objects in the environment 112 via triangulation of corresponding points identified in the depth image 136 from the left depth camera 114 and the depth image 138 from the right depth camera 116. To facilitate subpixel precision within a computational budget, the processor downsamples the depth image 136 captured by the left depth camera 114 to generate a first (left) reduced-resolution image (not shown) and downsamples the depth image 138 captured by the right depth camera 116 to generate a second (right) reduced-resolution image (not shown). The processor matches patches of the left reduced-resolution image to patches of the right reduced-resolution image to generate a coarse depth map of the environment 112. The processor then upsamples the coarse depth map using, e.g., bilinear interpolation, to the original resolution to predict a full-resolution disparity (depth) map. The processor refines the results of the full-resolution disparity map by matching the full-resolution disparity map to one of the depth images 136, 138, based on color, as explained further below.

Figure 2:
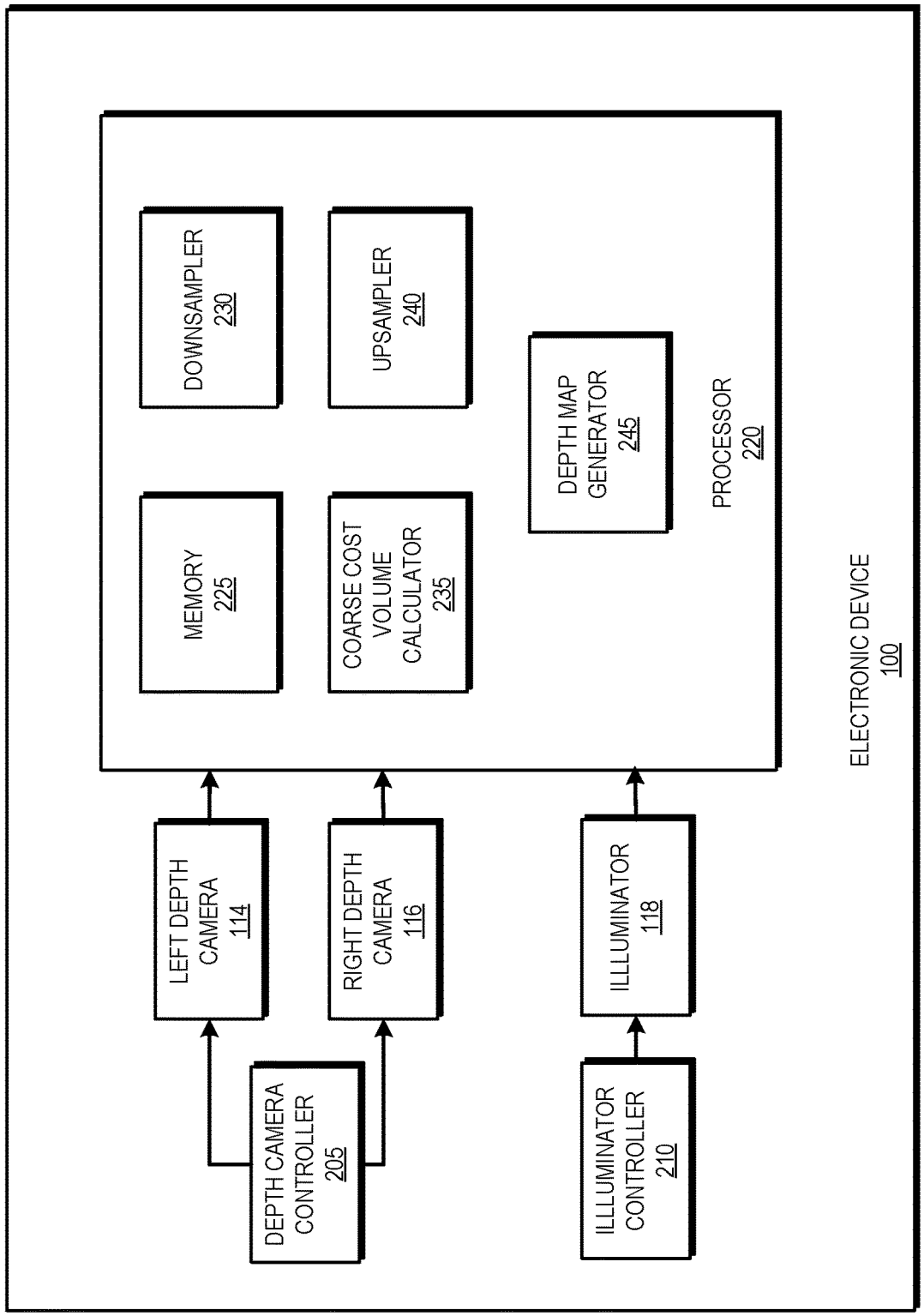
FIG. 2 is a block diagram of the electronic device of FIG. 1 in accordance with some embodiments.

FIG. 2 illustrates the electronic device 100 of FIG. 1 in greater detail in accordance with some embodiments. The electronic device 100 includes a depth camera controller 205 for controlling the left depth camera 114 and the right depth camera 116, an illuminator controller 210 for controlling the illuminator 118, and a processor 220. The processor 220 includes a memory 225, a downsampler 230, a coarse cost volume calculator 235, an upsampler 240, and a depth map generator 245.

The depth camera controller 205 is a module configured to control the activation and exposure times of the left depth camera 114 and the right depth camera 116. The depth camera controller 205 adjusts the frame rate, exposure time, and phase of the left depth camera 114 and the right depth camera 116. In some embodiments, the depth camera controller 205 coordinates the frame rate, exposure time, and phase of the left depth camera 114 and the right depth camera 116 in coordination with the illuminator controller 210. The illuminator controller 210 is a module configured to control the activation and pulse durations of, and illumination patterns projected by, the illuminator 118. The illuminator controller 210 activates the illuminator 118 to pulse an illumination pattern into the environment at a frequency and phase matched to the frequency and phase of one or both of the left depth camera 114 and the right depth camera 116.

The processor 220 is configured to receive depth images (not shown) from the left depth camera 114 (the left image) and the right depth camera 116 (the right image) at the memory 225. In some embodiments, the processor is further configured to receive images from the RGB camera (not shown) at the memory 225. In various embodiments, the memory 225 stores processing logic instructions, constant values, variable values during execution of portions of applications or other processing logic, or other desired information. During execution, applications, operating system functions, processing logic commands, and system software reside in memory 225. In some embodiments, other software commands (e.g., a device driver) also reside in memory 225 during execution of the processor 220. For example, the memory 225 stores a plurality of previously-generated depth images (not shown) that it receives from the left depth camera 114 and the right depth camera 116. In some embodiments, the memory 225 is implemented as a dynamic random access memory (DRAM), and in some embodiments, the memory 225 is implemented using other types of memory including static random access memory (SRAM), non-volatile RAM, and the like.

The downsampler 230 is a module configured to downsample the images received from the left depth camera 114 (referred to as the left depth image(s)) and the right depth camera 116 (referred to as the right depth image(s)) to generate reduced-resolution depth images (not shown). The downsampler 230 may be implemented as hard-coded logic, programmable logic, software executed by the processor 220, or a combination thereof. The downsampler 230 implements a feature network with shared weights between the left depth image and the right depth image (also referred to as a Siamese network). The downsampler 230 downsamples the left depth image and the right depth image. In some embodiments, the downsampler 230 downsamples the left depth image and the right depth image using K 5×5 convolutions with a stride of 2, keeping the number of channels at 32 throughout the downsampling. In some embodiments, the downsampler 230 sets K to 3 or 4. The downsampler 230 then applies 6 residual blocks that employ 3×3 convolutions, batch-normalization, and leaky ReLu activations ($\propto$=0.2). The downsampler 230 processes the result using a final layer with a 3×3 convolution that does not use batch-normalization or activation. The downsampler 230 outputs a 32-dimensional feature vector at each pixel in the downsampled image. The reduced-resolution depth images that the downsampler 230 generates have a large receptive field that is useful for textureless regions and keep the feature vectors compact.

The coarse cost volume calculator 235 is a module configured to compute a matching cost for patches of one or more pixels of the downsampled left and right image frames. The coarse cost volume calculator 235 generates a downsampled disparity map (e.g., a 160×90 disparity map) using a soft argmin operator. The coarse cost volume calculator 235 may be implemented as hard-coded logic, programmable logic, software executed by the processor 220, or a combination thereof. The coarse cost volume calculator 235 forms a cost volume at the reduced resolution of the reduced-resolution depth images by taking the difference between the feature vector (also referred to as an image feature) of a pixel and the feature vectors of matching candidates. In some embodiments, the coarse cost volume calculator 235 learns the right metric by running multiple convolutions followed by non-linearities. To aggregate context across the spatial domain as well as the disparity domain, the coarse cost volume calculator 235 filters the cost volume with four 3D convolutions with a filter size of 3×3×3, batch-normalization, and leaky ReLu activations. The coarse cost volume calculator 235 then applies a final 3×3×3 convolutional layer that does not use batch-normalization or activation, and the filtering layers produce a 1-dimensional output at each pixel and candidate disparity.

For example, for an input reduced-resolution depth image size of W×H and evaluation of a maximum of D candidate disparities, the cost volume size is $W/2^K \times H/2^K \times (D+1)/2^K$ for K downsampling layers. Because most of the time and compute is spent matching at higher resolutions, while most of the performance gain comes from matching at lower resolutions, the performance loss of matching the reduced-resolution depth maps is insignificant in light of the gain in speed. The coarse cost volume calculator 235 achieves a magnitude higher sub-pixel precision than conventional stereo matching approaches.

In some embodiments, the coarse cost volume calculator 235 selects a disparity which is a softmax-weighted combination of all the disparity values:

$$d_i = \sum_{d=1}^{D} d \cdot \frac{\exp(-c_i(d))}{\sum_{d'} \exp(-c_i(d'))} \quad (1)$$

The coarse cost volume calculator 235 applies a second differentiable variant that is a probabilistic selection that samples from the softmax distribution over the costs:

$$d_i = d, \text{ where } d \sim \frac{\exp(-c_i(d))}{\sum_{d'} \exp(-c_i(d'))} \quad (2)$$

The coarse cost volume calculator 235 differentiates through the sampling process using gradient estimation techniques to learn the distribution of disparities by minimizing the expected loss of the stochastic process. Using the soft arg min selection is faster to converge and easier to optimize than selecting the disparity with the minimum cost at each pixel in the filtered cost volume using a non-differentiable arg min.

The upsampler 240 is a module configured to upsample the downsampled disparity map output from the coarse cost volume calculator 235 to the original resolution. In some embodiments, the upsampler 240 upsamples a 160×90 disparity map using bi-linear interpolation and convolutions to the original resolution of 1280×720. The upsampler 240 may be implemented as hard-coded logic, programmable logic, software executed by the processor 220, or a combination thereof.

The depth map generator 245 is a module configured to hierarchically refine the output of the upsampler 240 with a cascade of the network and apply a single refinement that upsamples the coarse output to the full resolution in one shot. The depth map generator 245 outputs a full-resolution depth map that dilates and erodes around the edges using the color input from one of the left depth image or the right depth image as a guide. The depth map generator 245 may be implemented as hard-coded logic, programmable logic, software executed by the processor 220, or a combination thereof.

In some embodiments, the depth map generator 245 is trained in a fully supervised manner using groundtruth-labeled stereo data, and the depth map generator 245 minimizes the hierarchical loss function:

$$L = \Sigma_k \rho(d_i^k - \hat{d}_i) \quad (3)$$

where $d_i^k$ is the predicted disparity at pixel i at the kth refinement level, with k=0 denoting the output pre-refinement, $\hat{d}_i$ is the groundtruth disparity at the same pixel, and $\rho(.)$ is a two-parameter robust loss function $$\rho(x, \alpha, c) = \frac{|\alpha - 2|}{\alpha} \left( \left( \frac{(x/c)^2}{|\alpha - 2|} + 1 \right)^{\alpha/2} - 1 \right) \quad (4)$$

with its parameters set as $\propto$=1 and c=2, approximating a smoothed L1 loss.

Figure 3:
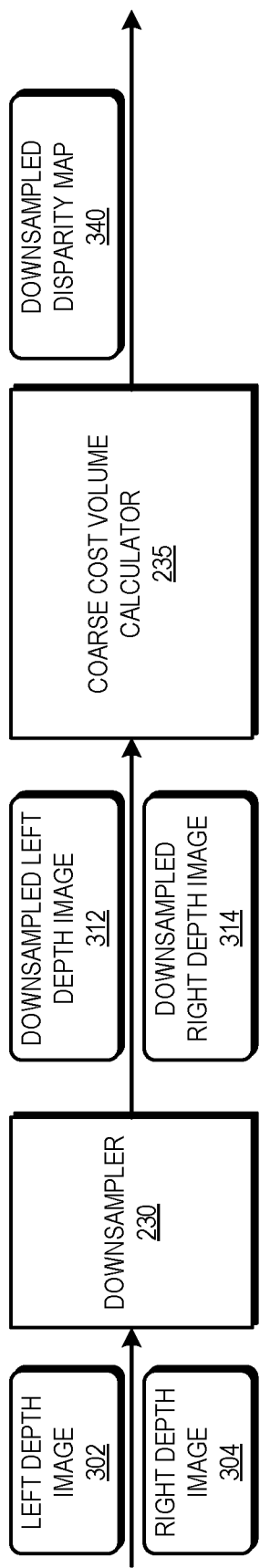
FIG. 3 is a block diagram illustrating the electronic device of FIG. 1 downsampling and comparing images of an environment in accordance with some embodiments.

FIG. 3 illustrates the electronic device 100 downsampling and comparing images of an environment in accordance with some embodiments. The downsampler 230 receives a high-resolution left depth image 302 captured by the left depth camera 114 and a high-resolution right depth image 304 captured by the right depth camera 116 from the memory 225 (not shown). The downsampler 230 produces a downsampled left depth image 312 feature map and a downsampled right depth image 314 feature map at a reduced resolution. For example, in some embodiments, the downsampled left depth image 312 and the downsampled right depth image 314 are ⅛ of the input resolutions of the left depth image 302 and the right depth image 304.

The coarse cost volume calculator 235 receives the downsampled left depth image 312 and the downsampled right depth image 314 from the downsampler 230 and builds a low-resolution cost volume (not shown). In some embodiments, the coarse cost volume calculator 235 builds a low-resolution cost volume of size 160×90×18, allowing for a maximum disparity of 144 in the original image, which corresponds to a minimum distance of ~30 cm on the chosen sensor. The coarse cost volume calculator 235 produces a downsampled 160×90 disparity map 340 using the soft argmin operator. In some embodiments, the coarse cost volume calculator 235 matches the downsampled left image 312 to the downsampled right depth image 314 to produce a first downsampled disparity map 340, and matches the downsampled right depth image 314 to the downsampled left depth image 312 to produce a second downsampled disparity map (not shown).

Figure 4:
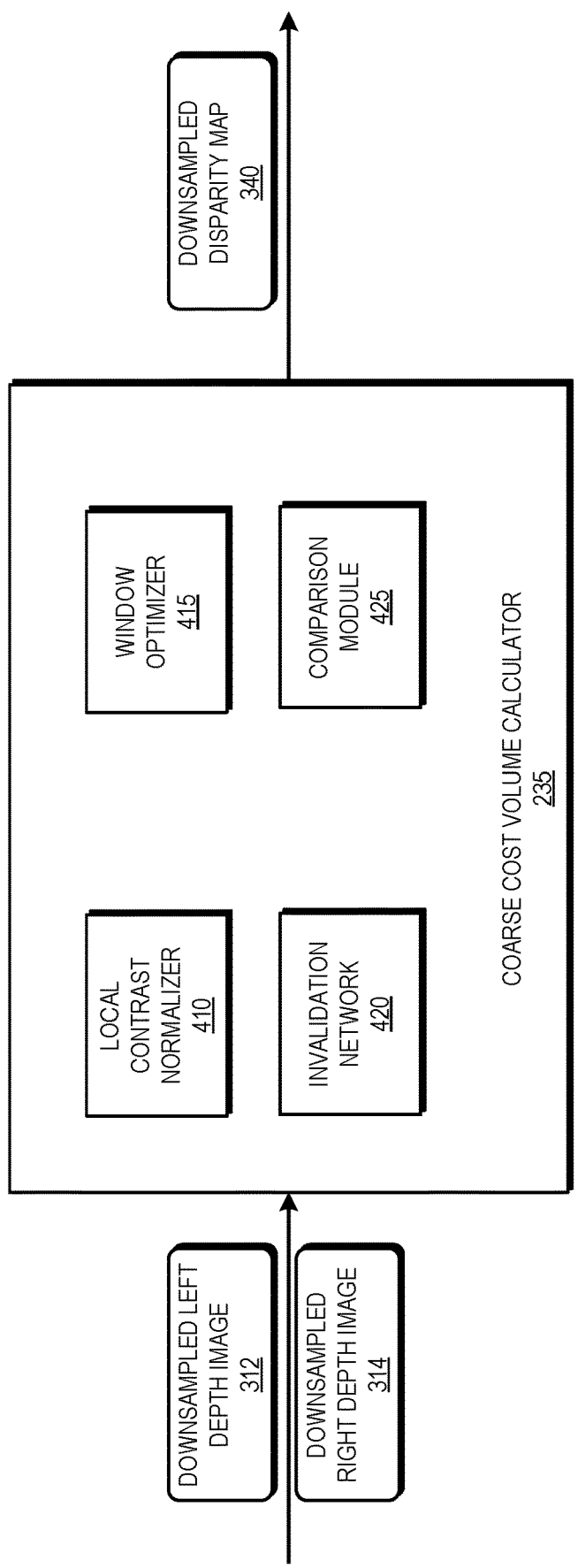
FIG. 4 is a block diagram illustrating the electronic device of FIG. 1 applying local contrast normalization, window-based loss aggregation, and an invalidation mask to downsampled images in accordance with some embodiments.

FIG. 4 illustrates the electronic device 100 applying local contrast normalization, window-based loss aggregation, and an invalidation mask to downsampled images in accordance with some embodiments. In some embodiments, the coarse cost volume calculator 235 includes a local contrast normalizer 410, a window optimizer 415, an invalidation network 420, and a comparison module 425, each of which may be implemented as hard-coded logic, programmable logic, software executed by the processor 220, or a combination thereof.

The local contrast normalizer 410 removes the dependency between intensity and disparity and provides improved residual in occluded regions. The illuminator 118 (not shown) floods the environment 112 of the electronic device 100 with texture, and the intensity of the received signal follows the inverse square law $$I \propto \frac{1}{Z^2},$$

where Z is the distance from the camera. This creates an explicit dependency between the intensity and the distance (i.e., brighter pixels are closer). In addition, the difference between two bright pixels is likely to have a bigger residual when compared to the difference between two dark pixels. Further, when the intensity difference between background and foreground is severe, the loss will have a strong contribution in occluded regions, forcing the network to learn to fit areas that cannot really be explained in the data.

The local contrast normalizer 410 computes, for each pixel, the local mean μ and standard deviation σ in a small (e.g., 9×9) patch. The local contrast normalizer 410 uses these local statistics to normalize the current pixel intensity $$I_{LCN} = \frac{I - \mu}{\sigma + \eta},$$

where η is a small constant. The normalized pixel intensity removes the dependency between disparity and brightness, and the reconstruction error is not strongly biased toward high intensity areas or occluded regions.

In low texture regions, the standard deviation a is close to zero which would amplify any residual together with noise between two matched pixels. To remove this effect, the local contrast normalizer 410 re-weights the residual ϵ between two matched pixels $I_{ij}$ and $\hat{I}_{ij}^l$ using the local standard deviation $\sigma_{ij}$ estimated on the reference image in a 9×9 patch around the pixel (i,j). The local contrast normalizer 410 calculates a reconstruction loss $$L = \Sigma_{ij} \|\sigma_{ij}(I_{LCN_{ij}}^l - \hat{I}_{LCN_{ij}}^l)\|_1 = \Sigma_{ij} C_{ij}. \quad (5)$$

The window optimizer 415 is a module configured to smooth the cost function while preserving edges. For a single pixel cost, the loss function exhibits a highly non-convex behavior with respect to the disparity that makes it more difficult to retrieve the ground truth value due to a single pixel cost having many local minima that could lie far from the actual optimum. The window optimizer 415 considers a window around each pixel in which the contribution of each pixel in the window for matching is based on a distance from the center pixel of the window and a difference in color between each pixel in the window and the center pixel of the window. In some embodiments, the window optimizer 415 integrates an adaptive support scheme in a training procedure that does not affect the runtime cost.

In some embodiments, the window optimizer 415 considers a pixel (i,j) with intensity $I_{ij}$ and instead of computing a per-pixel loss, the window optimizer 415 aggregates the costs $C_{ij}$ around a 2k×2k window following $$\hat{C}_{ij} = \frac{\sum_{x=i-k}^{i+k-1} \sum_{y=j-k}^{j+k-1} \omega_{x,y} C_{ij}}{\sum_{x=i-k}^{i+k-1} \sum_{y=j-k}^{j+k-1} \omega_{x,y}}, \text{ where} \quad (6)$$

$$\omega_{x,y} = \exp\left(-\frac{|I_{ij} - I_{xy}|}{\sigma_\omega}\right) \text{ with } \sigma_\omega = 2.$$

The invalidation network 420 is a module configured to apply an invalidity mask to pixels that are occluded in one or both of the downsampled left depth image 312 and the downsampled right depth image 314. An occluded pixel does not have any useful information in the cost volume even when a brute-force search is performed at different scales. The invalidation network thus identifies matching pixels having a disparity greater than a threshold and ignores the identified pixels when performing a loss computation. To avoid oversmooth edges which become flying pixels (outliers) in the pointcloud, the invalidation network 420 uses a left-right consistency check, in which a disparity is first computed from the left viewpoint ($d_l$), then from the right viewpoint ($d_r$), and invalidates those pixels with $|d_l - d_r| > \theta$, as a hard constraint. The invalidation network 420 defines a mask for a pixel (i,j):

$$m_{ij} = |d_l - d_r| < \theta, \quad (7)$$

with θ=1 disparity. Those pixels with $m_{ij}=0$ are ignored in the loss computation. To avoid a trivial solution, for example, one in which all the pixels are invalidated, in some embodiments, the invalidation network 420 enforces a regularization on the number of valid pixels by minimizing the cross-entropy loss with constant label 1 in each pixel location. In some embodiments, the invalidation network 420 applies the invalidation mask in both the low-resolution disparity as well as the final refined (full-resolution) disparity.

In some embodiments, the processor 220 (not shown) trains the invalidation network 420 that takes as input the features computed from the downsampled left depth image 312 and the downsampled right depth image 314 and produces a low resolution invalidation mask (not shown), which is then upsampled by the upsampler 240 and refined with a similar architecture used for the disparity refinement at the depth map generator 245. By applying the invalidation mask, the invalidation network 420 avoids, at runtime, predicting the disparity from both the left and the right viewpoint to perform the left-right consistency check, making the inference significantly faster.

Figure 5:
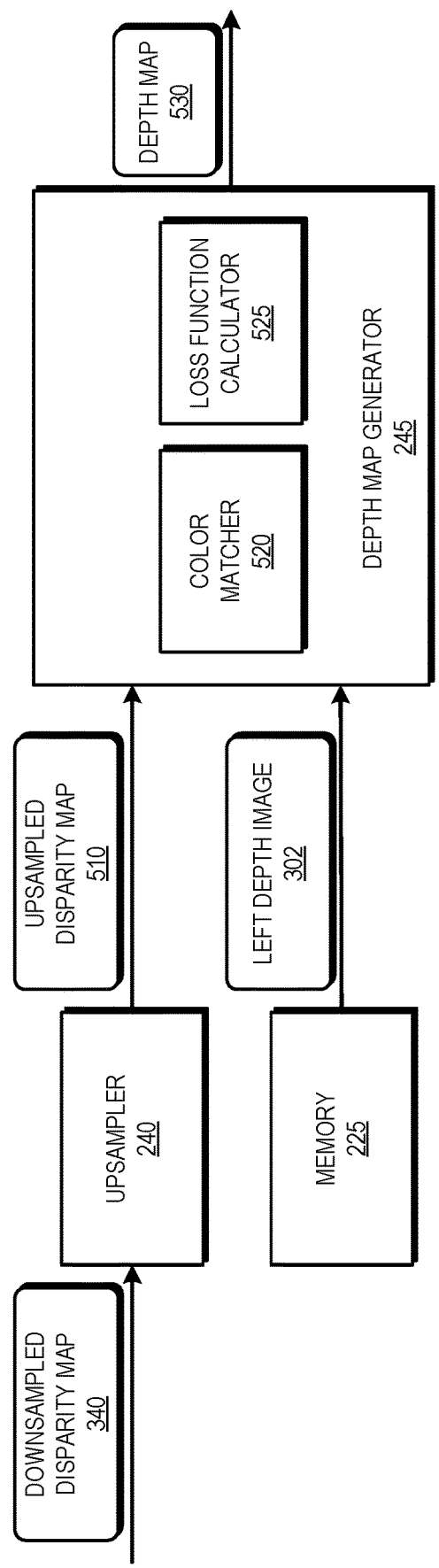
FIG. 5 is a block diagram illustrating the electronic device of FIG. 1 upsampling and refining a downsampled disparity map in accordance with some embodiments.

FIG. 5 illustrates the electronic device 100 upsampling and refining a downsampled disparity map 340 output from the coarse cost volume calculator 235 in accordance with some embodiments. The upsampler 240 receives the downsampled disparity map 340 from the coarse cost volume calculator 235. The upsampler 240 upsamples the downsampled disparity map 340 using, e.g., bi-linear interpolation, to the original resolution of the left depth image 302 and the right depth image 304 to produce an upsampled disparity map 510. The depth map generator 245 receives as inputs the upsampled disparity map 510 as well as the left depth image 302 from the memory 225 and outputs a depth map 530 (also referred to as a left check).

In some embodiments, the upsampler 240 receives a downsampled disparity map based on matching the downsampled right depth image 314 to the downsampled left depth image 312. The upsampler 240 upsamples the downsampled disparity map to the original resolution of the left depth image 302 and the right depth image 304 to produce an upsampled disparity map (not shown). The depth map generator 245 receives as inputs an upsampled disparity map as well as the right depth image 304 from the memory 225 and outputs a depth map (not shown) (also referred to as a right check).

The depth map generator 245 includes a color matcher 520 and a loss function calculator 525. The color matcher 520 and the loss function calculator 525 may be implemented as hard-coded logic, programmable logic, software executed by the processor 220, or a combination thereof. In some embodiments, the color matcher 520 passes the concatenated color of the left depth image 302 and the upsampled disparity map 510 through a 3×3 convolutional layer that outputs a 32-dimensional representation. The color matcher 520 then passes the 32-dimensional representation through 6 residual blocks that employ 3×3 convolutions, batch-normalization, and leaky ReLu activations ($\alpha=0.2$). The color matcher 520 uses atrous convolutions in these blocks to sample from a larger context without increasing the network size. The color matcher 520 sets the dilation factors for the residual blocks to 1, 2, 4, 8, 1, and 1, respectively. The color matcher 520 then processes this output using a 3×3 convolutional layer that does not use batch-normalization or activation. The color matcher 520 outputs a 1-dimensional disparity residual that is added to the previous prediction. The color matcher 520 applies a ReLu to the sum to constrain disparities to be positive.

The loss function calculator 525 is a module configured to refine the full-resolution depth map. The loss function calculator 525 hierarchically refines the output of the color matcher 520 with a cascade of the network by applying the hierarchical loss function of equation (3) above to generate a refined full-resolution depth map 530. In some embodiments, the loss function calculator 525 refines the full-resolution depth map based on a comparison of the left check depth map and the right check depth map.

Figure 6:
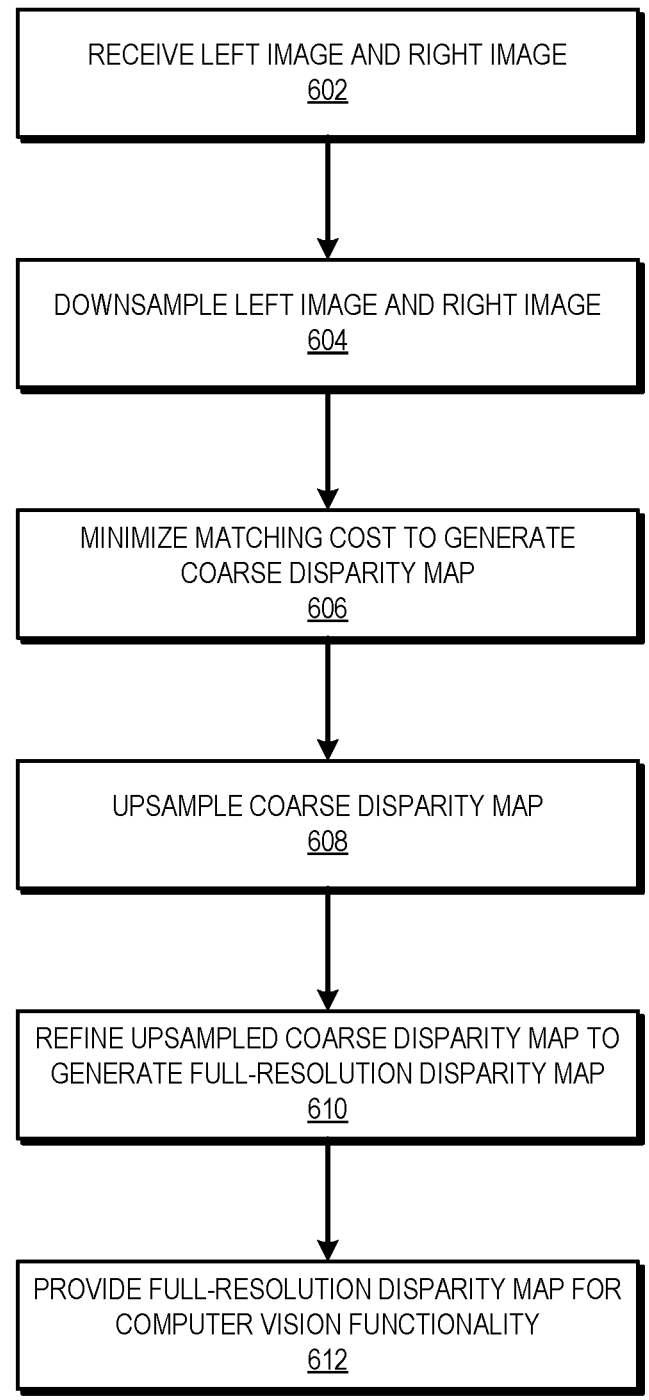
FIG. 6 is a flow diagram illustrating a method of estimating a depth map based on captured depth images in accordance with some embodiments.

FIG. 6 illustrates a method 600 of estimating a depth map based on captured depth images in accordance with some embodiments. The method 600 is implemented in some embodiments of the electronic device 100 shown in FIGS. 1-5. At block 602, the processor 220 receives the left depth image 302 captured by the left depth camera 114 and the right depth image 304 captured by the right depth camera 116. At block 604, the downsampler 230 downsamples the left depth image 302 and the right depth image 304 to generate downsampled (reduced-resolution) depth images 312, 314. At block 606, the coarse cost volume calculator 235 generates a coarse (downsampled) disparity map 340 based on minimizing a matching cost.

In some embodiments, the coarse cost volume calculator 235 normalizes local contrast, applies a window optimizer, and/or applies an invalidation mask to the downsampled depth images 312, 314 before calculating a loss function for the downsampled depth images 312, 314. In embodiments in which the coarse cost volume calculator 235 normalizes local contrast, the local contrast normalizer 410 removes low frequency components from passive IR and re-calibrates the strength of the active pattern locally to account for fading of active stereo patterns projected by the illuminator 118 with distance. In embodiments in which the coarse cost volume calculator 235 applies a window optimizer 415, the window optimizer 415 applies a window-based loss aggregation with adaptive weights for each pixel to increase the pixel's discriminability and reduce the effect of local minima in the stereo cost function. In embodiments in which the coarse cost volume calculator 235 applies an invalidation mask, the invalidation network 420 detects occluded pixels in the downsampled left depth image 312 and the downsampled right depth image 314 and omits the occluded pixels from loss computations. Application of the local contrast normalizer 410, window optimizer 415, and invalidation network 420 improve convergence during training and improve depth accuracy at test time.

At block 608, the upsampler 240 upsamples the coarse disparity map 340 using bilinear interpolation to the original resolution of the left depth image 302 and the right depth image 304. At block 610, the depth map generator 245 refines the upsampled disparity map 510 to generate a full-resolution disparity map by retrieving the high frequency details such as edges. In some embodiments, the depth map generator 245 retrieves the high frequency details by matching the upsampled disparity map 510 to one of the left depth image 302 and the right depth image 304 based on color. In some embodiments, the depth map generator 245 starts with separate convolution layers running on the upsampled disparity map 510 and the left depth image 302 (or right depth image 304), respectively, and merges the features later to produce a residual to facilitate removal of dot artifacts from the depth map 530. At block 612, the depth map generator 245 provides the full-resolution disparity map to the electronic device 100 for computer vision functionality, such as 3D reconstruction, localization and tracking, virtual and augmented reality, and applications such as indoor mapping and architecture, autonomous cars, and human body and face mapping.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
projecting, at an illuminator of an electronic device, an illumination pattern into an environment of the electronic device;
capturing a first image of the environment from a first camera of an infrared stereo camera pair and a second image of the environment from a second camera of the infrared stereo camera pair;
downsampling the first image to generate a first reduced-resolution image and downsampling the second image to generate a second reduced-resolution image;
matching patches of the first reduced-resolution image to patches of the second reduced-resolution image to generate a first coarse depth map of the environment, wherein each patch comprises at least one pixel;
normalizing an intensity of each pixel based on neighboring pixels of each pixel;
upsampling the first coarse depth map to a resolution of the first image to generate a first full resolution depth map; and
employing the first full resolution depth map to support computer vision functionality at the electronic device.

2. The method of claim 1, further comprising determining an error of the first full resolution depth map based on matching patches of the first full resolution depth map to patches of the first image based on color.

3. The method of claim 2, further comprising:
matching patches of the second reduced-resolution image to patches of the first reduced-resolution image to generate a second coarse depth map of the environment; and
upsampling the second coarse depth map to a full resolution of the second image to generate a second full resolution depth map.

4. The method of claim 3, further comprising:
determining an error of the second full resolution depth map based on matching patches of the second full resolution depth map to patches of the second image based on color.

5. The method of claim 3, further comprising:
matching pixels of the first coarse depth map of the environment to pixels of the second coarse depth map of the environment to identify matching pixels having a disparity greater than a threshold; and
wherein determining the error comprises ignoring the identified matching pixels.

6. The method of claim 1, further comprising adding details from the first image to the first full resolution depth map.

7. The method of claim 1, wherein matching patches comprises:
assigning a value to each patch based on a contribution of each pixel of the patch, wherein the contribution is based on at least one of a distance of a pixel from a center pixel of the patch and a difference in color between the pixel and the center pixel of the patch; and
comparing the values of the patches of the first reduced-resolution image to the values of the patches of the second reduced-resolution image.

8. An electronic device comprising:
an illuminator to project an illumination pattern into an environment of the electronic device;
an infrared stereo camera pair comprising a first camera to capture a first image of the environment and a second camera to capture a second image of the environment; and
a processor configured to:
downsample the first image to generate a first reduced-resolution image and downsampling the second image to generate a second reduced-resolution image;
match patches of the first reduced-resolution image to patches of the second reduced-resolution image to generate a first coarse depth map of the environment, wherein each patch comprises one or more pixels;

normalize an intensity of each pixel based on neighboring pixels of each pixel;

upsample the first coarse depth map to a resolution of the first image to generate a first full resolution depth map; and employ the first full resolution depth map to support computer vision functionality at the electronic device.

9. The electronic device of claim 8, wherein the processor is further configured to determine an error of the first full resolution depth map based on matching patches of the first full resolution depth map to patches of the first image based on color.

10. The electronic device of claim 9, wherein the processor is further configured to:

match patches of the second reduced-resolution image to patches of the first reduced-resolution image to generate a second coarse depth map of the environment; and upsample the second coarse depth map to a full resolution of the second image to generate a second full resolution depth map.

11. The electronic device of claim 10, wherein the processor is further configured to:

determine an error of the second full resolution depth map based on matching patches of the second full resolution depth map to patches of the second image based on color.

* * * * *